US010928323B2

(12) United States Patent
Suzuki

(10) Patent No.: US 10,928,323 B2
(45) Date of Patent: Feb. 23, 2021

(54) DETECTION DEVICE, DETECTION METHOD, AND DETECTION SYSTEM

(71) Applicant: Konica Minolta, Inc., Tokyo (JP)

(72) Inventor: Yuta Suzuki, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 116 days.

(21) Appl. No.: 15/775,505

(22) PCT Filed: Nov. 2, 2016

(86) PCT No.: PCT/JP2016/082678
§ 371 (c)(1),
(2) Date: May 11, 2018

(87) PCT Pub. No.: WO2017/082145
PCT Pub. Date: May 18, 2017

(65) Prior Publication Data

US 2018/0364167 A1 Dec. 20, 2018

(30) Foreign Application Priority Data

Nov. 13, 2015 (JP) ............................ JP2015-223415

(51) Int. Cl.
*G01N 21/64* (2006.01)
*G01N 1/44* (2006.01)

(52) U.S. Cl.
CPC ............. *G01N 21/648* (2013.01); *G01N 1/44* (2013.01); *G01N 21/64* (2013.01)

(58) Field of Classification Search
CPC ......... G01N 21/648; G01N 21/64; G01N 1/44
See application file for complete search history.

(56) References Cited

U.S. PATENT DOCUMENTS

2009/0218496 A1* 9/2009 Kimura .................. G01N 21/03 250/362
2016/0266111 A1* 9/2016 Nagae ................... B01L 3/5027

FOREIGN PATENT DOCUMENTS

JP 2003329580 A 11/2003
JP 2009204486 A 9/2009
(Continued)

OTHER PUBLICATIONS

Katsumi—JP 2003-329580 A—Google Patents English Translation obtained Dec. 11, 2019. (Year: 2019).*
(Continued)

*Primary Examiner* — David P Porta
*Assistant Examiner* — Jeremy S Valentiner
(74) *Attorney, Agent, or Firm* — Lucas & Mercanti, LLP

(57) ABSTRACT

In the present invention, a detection device has a chip holder, an excitation-light radiation unit, and a heat source. The chip holder is used for positioning a detection chip that has: a prism; a metal film; a trapping body; and a substrate. The excitation-light radiation unit radiates excitation light at the reaction site via the light-entry surface of the detection chip, which is held by the chip holder. The heat source is disposed in a position so as to face, in a non-contacting manner, the surface of the prism of the detection chip held by the chip holder that is closest to the reaction site, and so as not to interfere with the optical path of the excitation light. The chip holder positions the detection chip while in contact with only the reverse surface of the substrate and/or a convex portion positioned on the prism.

8 Claims, 8 Drawing Sheets

100 120 194 133 193 192 191 143 142 γ 134 161 162 163 144 131 185 184 β α 153 152 154 151 141 132 110

(56) References Cited

FOREIGN PATENT DOCUMENTS

| | | | | |
|---|---|---|---|---|
| WO | 2015064757 A1 | | 5/2015 | |
| WO | WO-2015064757 A1 | * | 5/2015 | ........... G01N 21/648 |
| WO | 2015152198 A1 | | 10/2015 | |

OTHER PUBLICATIONS

JPO, Notification of Reasons for Refusal for the corresponding Japanese patent application No. 2017-550285, dated Nov. 26, 2019, with machine English translation (6 pages).
Written Opinion of the International Searching Authority dated Jan. 31, 2017 from International Application No. PCT/JP2016/082678 and English translation.
EPO, Office Action for the corresponding European patent application No. 16864108.2, dated Nov. 24, 2020.

* cited by examiner

DETECTION DEVICE, DETECTION METHOD, AND DETECTION SYSTEM

CROSS REFERENCE TO RELATED APPLICATION

This Application is a 371 of PCT/JP2016/082678 filed on Nov. 2, 2016 which, in turn, claimed the priority of Japanese Patent Application No. 2015-223415 filed on Nov. 13, 2015, all applications are incorporated herein by reference.

TECHNICAL FIELD

The present invention relates to a detection apparatus, a detection method and a detection system for detecting the presence or the amount of a detection object substance contained in a sample by use of surface plasmon resonance.

BACKGROUND ART

Highly sensitive and quantitative detection of a trace detection object substance such as protein and DNA in laboratory tests makes it possible to perform treatment by quickly determining the patient's condition. In view of this, the analysis method and the analysis device which can quantitatively detect a minute amount of a detection object substance with high sensitivity are demanded.

Surface plasmon-field enhanced fluorescence spectroscopy (hereinafter abbreviated as "SPFS") method is known as a method which can detect a detection object substance with high sensitivity (see, for example, PTL 1).

PTL 1 discloses a detection apparatus and a detection method using the SPFS method. The detection apparatus and the detection method use a detection chip that includes: a prism formed of a dielectric and including an incidence surface, an emission surface, a bottom surface and a film formation surface; a metal film formed on the film formation surface; a capturing body (for example antibody) fixed on the metal film; and a base disposed on the surface on which the capturing body on the metal film is disposed. Together with the metal film, the base forms a liquid storage section for storing liquid.

When a sample containing a detection object substance is provided on the metal film (liquid storage section), the detection object substance is captured by the capturing body (first-order reaction). The detection object substance thus captured is then labeled by a fluorescence material (second-order reaction). When the metal film in this state is irradiated with excitation light through the prism at an angle that causes surface plasmon resonance, localized light can be generated on the metal film. With this localized-field light, the fluorescence material labelling the captured detection object substance on the metal film is selectively excited, and fluorescence emitted from the fluorescence material is observed. In the analysis device and the analysis method, the fluorescence is detected to detect the presence or the amount of the detection object substance.

CITATION LIST

Patent Literature

PTL 1
WO2015/064757

SUMMARY OF INVENTION

Technical Problem

A first-order reaction and a second-order reaction using an antibody such as those disclosed in PTL 1 are maximized at approximately 37° C. higher than room temperature. In view of this, the detection apparatus disclosed in PTL 1 includes a heating section for heating the liquid in the liquid storage section to a predetermined temperature for the purpose of appropriately causing the first-order reaction and the second-order reaction. The heating section includes a heat source and a heat block. The heat block sets a detection chip at a predetermined position so that excitation light is appropriately applied to the incidence surface.

FIGS. 1A to 1C illustrate positional relationships between detection chip 10 and heat block 20 disclosed in PTL 1. In the examples illustrated in FIGS. 1A to 1C, detection chip 10 and heat block 20 are in contact with each other or separated from each other.

In the example illustrated in FIG. 1A, heat block 20 positions detection chip 10 by supporting rear surface 16 of base 15. However, heat block 20 requires a long heating time since heat block 20 heats the liquid in the liquid storage section through base 15.

In addition, in the example illustrated in FIG. 1B, heat block 20 positions detection chip 10 by supporting rear surface 16 of base 15, incidence surface 12 of prism 11, bottom surface 13 and emission surface 14. However, heat block 20 is located close to or in contact with rear surface 16 of base 15, incidence surface 12 of prism 11, bottom surface 13, and emission surface 14. In the example illustrated in FIG. 1B, the position of detection chip 10 might be shifted when prism 11 is deformed due to heating. In addition, manufacturing errors of detection chip 10 and heat block 20 might prevent positioning. Further, disturbance might make it difficult to set the positional relationship between detection chip 10 and heat block 20.

Further, in the example illustrated in FIG. 1C, detection chip 10 cannot be accurately positioned since heat block 20 supports only bottom surface 13 of prism 11.

Consequently, in the detection apparatus disclosed in PTL 1, the positioning of detection chip and high-speed heating of the liquid in the channel might not be achieved at the same time.

In view of this, an object of the present invention is to provide a detection apparatus, a detection method and a detection system that can appropriately positon a detection chip and can heat liquid in a channel.

Solution to Problem

To solve the above-mentioned problems, a detection apparatus according to an embodiment of the present invention is an apparatus for detecting presence or an amount of a detection object substance contained in a sample by utilizing surface plasmon resonance, the detection apparatus including: a chip holder for positioning a detection chip, the detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage section that stores liquid; an excitation light irradiation section that emits excitation light toward a rear surface of the metal film through the incidence surface of the detection chip held in the chip holder, the rear surface corresponding to the reaction site; a heat source disposed to face one surface of the prism of the detection chip held in the chip holder without making contact with the one surface of the prism, the one surface of the prism being closest to the reaction site among the surfaces of the prism which do not interfere with a light path of the excitation light; and a light detection section that detects fluorescence generated by a fluorescence material captured by the capturing body in the reaction site and excited by the excitation light, or detects reflection light of excitation light reflected by the metal film and emitted from the emission surface. The chip holder positions the detection chip by making contact with at least one of a bottom surface of the base and a reference surface disposed on the prism, or by holding at least one of the bottom surface and the reference surface.

To solve the above-mentioned problems, a detection method according to an embodiment of the present invention is a method of detecting presence or an amount of a detection object substance contained in a sample by utilizing surface plasmon resonance, the method including: preparing a detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage section that stores liquid, the detection chip including a reference surface formed at a bottom surface of the base or the prism; positioning the detection chip with respect to the chip holder by bringing at least one of the bottom surface and the reference surface and a chip holder for setting a position of the detection chip into contact with each other, or by holding at least one of the bottom surface and the reference surface on the chip holder; heating liquid in the liquid storage section with a heat source, the heat source being disposed to face one surface of the prism of the detection chip positioned in the chip holder without making contact with of the one surface of the prism, the one surface of the prism being closest to the reaction site among the surfaces of the prism which do not interfere with a light path of excitation light emitted toward a rear surface of the metal film through the incidence surface, the rear surface corresponding to the reaction site; emitting excitation light toward the rear surface of the metal film that corresponds to the reaction site through the incidence surface; and detecting fluorescence generated by a fluorescence material captured by the capturing body in the reaction site and excited with the excitation light, or reflection light of excitation light reflected by the metal film and emitted from the emission surface.

To solve the above-mentioned problems, a detection system according to an embodiment of the present invention is a system for detecting presence or an amount of a detection object substance contained in a sample by utilizing surface plasmon resonance, the detection system including: a detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage section that stores liquid, the detection chip including a reference surface formed at a bottom surface of the base and the prism; a chip holder for positioning the detection chip by making contact with at least one of the bottom surface and the reference surface, or by holding the bottom surface and the reference surface; an excitation light irradiation section that emits excitation light toward the reaction site through the incidence surface; a heat source disposed to face one surface of the prism of the detection chip held in the chip holder without making contact with the one surface of the prism, the one surface of the prism being closest to the reaction site among the surfaces of the prism which do not interfere with a light path of the excitation light; and a light detection section that detects fluorescence generated by a fluorescence material captured by the capturing body in the reaction site and excited by the excitation light, or detects reflection light of excitation light reflected by the metal film and emitted from the emission surface.

DESCRIPTION OF EMBODIMENTS

Embodiments of the present invention are elaborated below with reference to the accompanying drawings.

Embodiment 1

In Embodiment 1, a mode of an SPFS system that is a detection system according embodiments of the present invention is described.

First, an overview of the SPFS system is described. In the SPFS system, excitation light is applied to a metal film on a prism formed of a dielectric at an angle at which surface plasmon resonance is caused, and thus localized light (generally, also called "evanescent light" or "near-field light") is generated on the surface of the metal film. In the SPFS system, a fluorescence material labelling a detection object substance disposed in a reaction site on the metal film is selectively excited by the localized light, and the quantity of fluorescence emitted from the fluorescence material is detected to detect the presence or the quantity of the detection object substance.

Figure 1A:
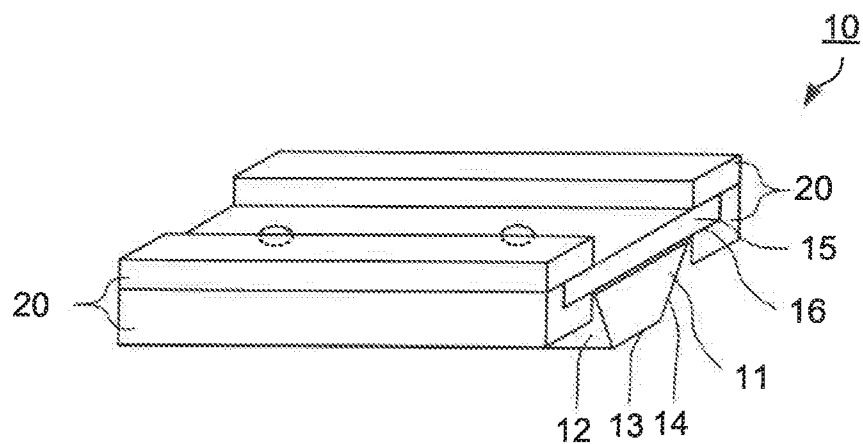
FIGS. 1A to 1C illustrate a positional relationship between a detection chip and a heat block disclosed in PTL 1.
Figure 1B:
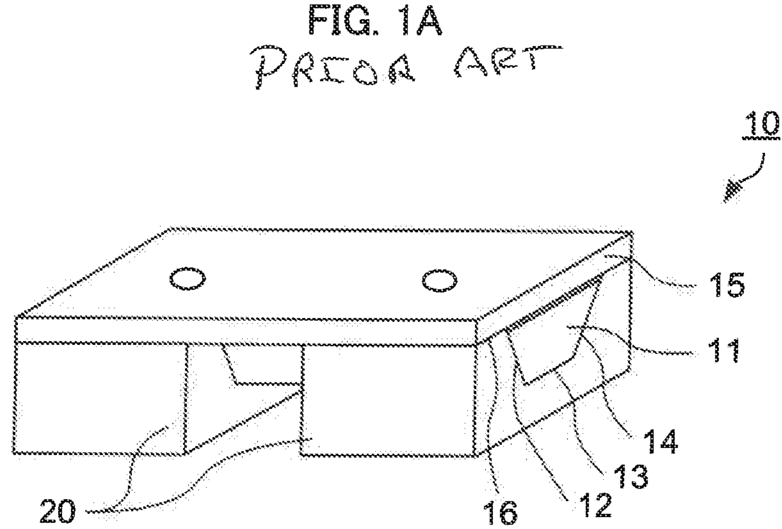
Figure 1C:
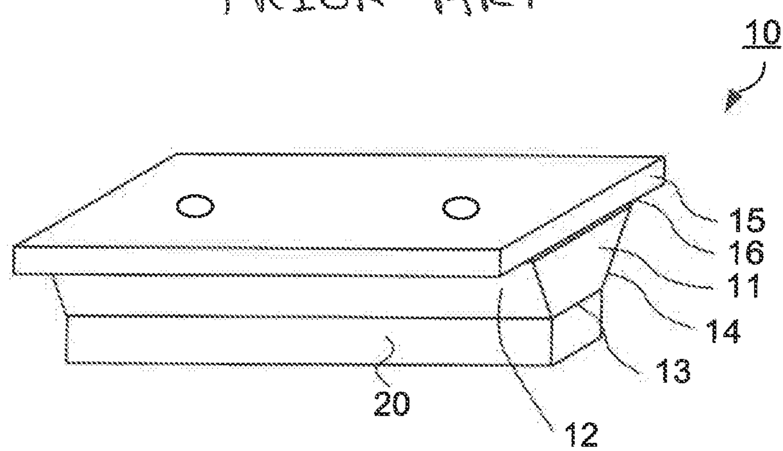
Figure 2:
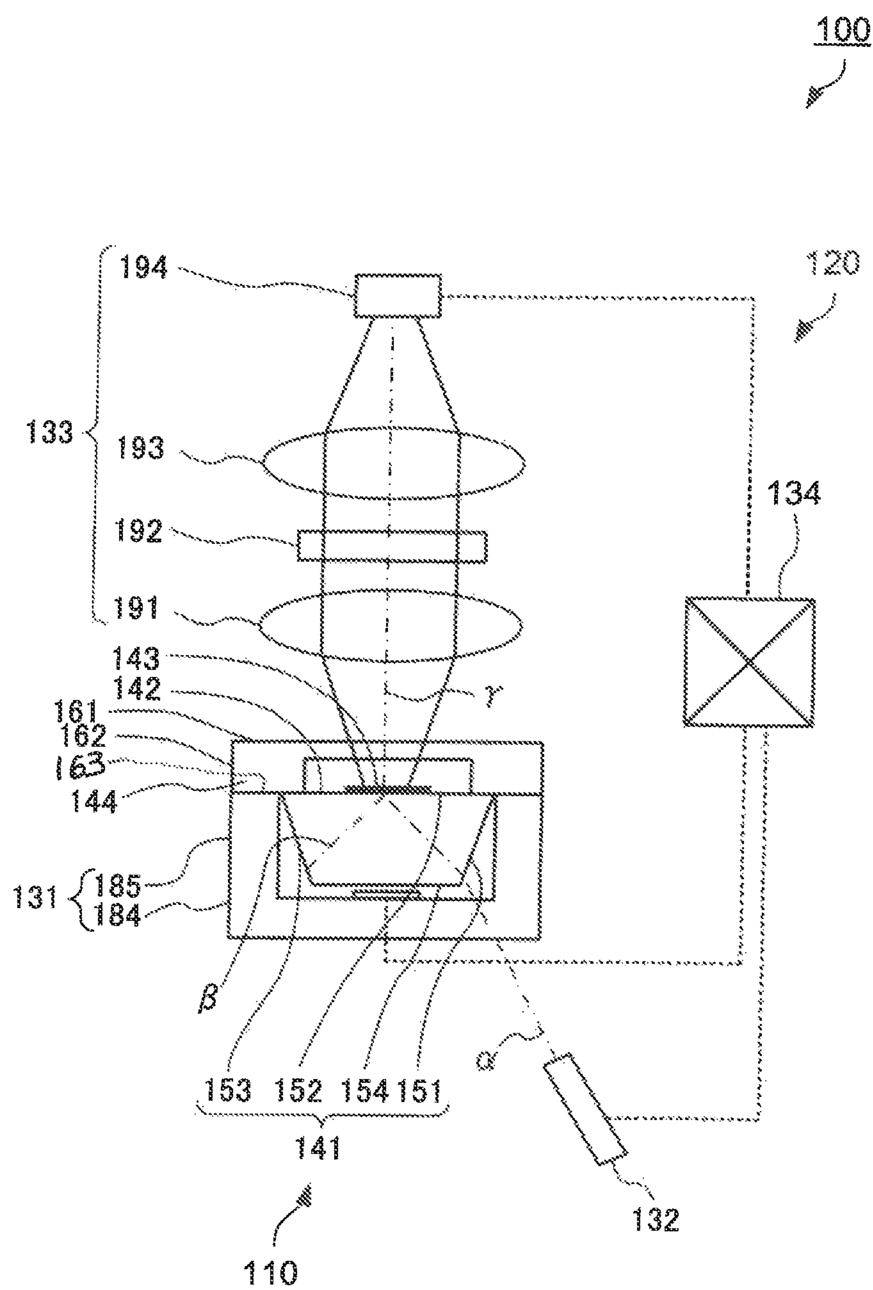
FIG. 2 is a schematic view of an SPFS system according to Embodiment 1.

FIG. 2 is a schematic view illustrating a configuration of SPFS system 100 according to Embodiment 1. As illustrated in FIG. 2, SPFS system 100 includes detection chip 110 and SPFS apparatus 120. In addition, SPFS apparatus 120 includes chip holder 131, excitation light irradiation section 132, light detection section 133 and control section 134. At the time of detecting a detection object substance, SPFS apparatus 120 is used in the state where detection chip 110 is mounted in chip holder 131. For such a configuration, detection chip 110 is described first, and thereafter the components of SPFS device 120 are described.

Figure 3A:
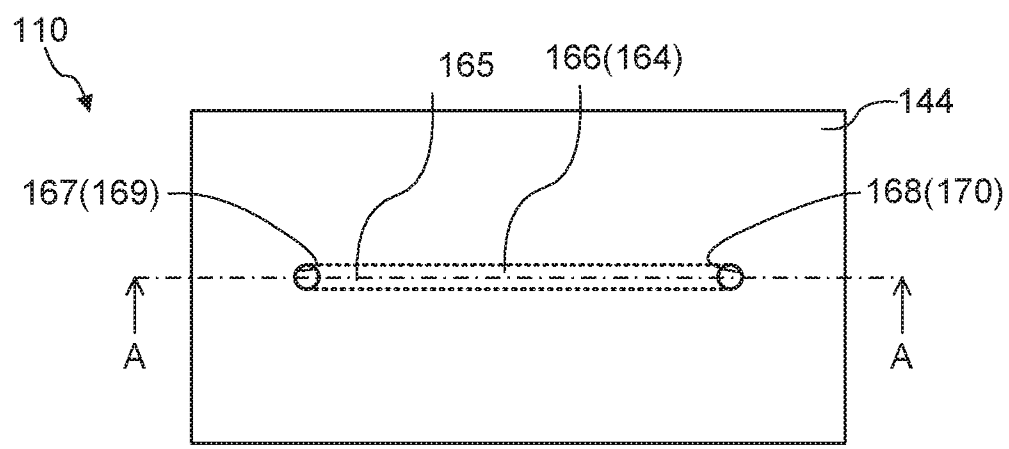
FIGS. 3A to 3C illustrate a configuration of a detection chip in an SPFS system of Embodiment 1.
Figure 3B:
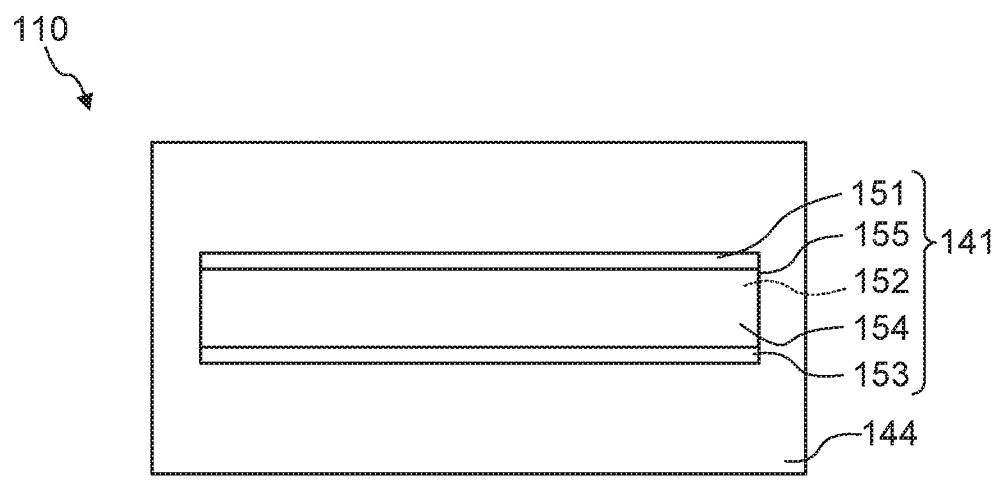
Figure 3C:
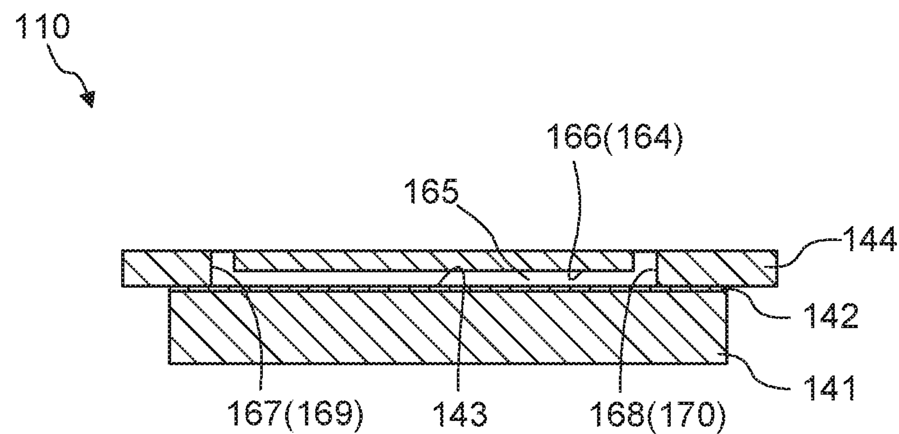

FIG. 3 illustrates a configuration of detection chip 110 of SPFS system 100 according to Embodiment 1. FIG. 3A is a plan view of detection chip 110, FIG. 3B is a bottom view of detection chip 110, and FIG. 3C is a sectional view taken along line A-A of FIG. 3A.

As illustrated in FIGS. 2 to 3C, detection chip 110 includes prism 141, metal film 142, reaction site 143 and base 144. Normally, detection chip 10 is replaced for each detection. The size of detection chip 110 is not limited, and preferably, the length of each side of detection chip 110 is several millimeters to several centimeters.

Prism 141 is formed of a dielectric that is transparent to excitation light α. Prism 141 includes incidence surface 151, film formation surface (reflecting surface) 152, emission surface 153, bottom surface 154 and side surface 155. Incidence surface 151 allows excitation light α emitted from excitation light irradiation section 132 to enter prism 141. Film formation surface 152 reflects excitation light α having entered prism 141. Metal film 142 including reaction site 143 is formed on film formation surface 152. Excitation light α reflected by film formation surface 152 becomes reflection light β. Emission surface 153 emits reflection light β out of prism 141. Bottom surface 154 is disposed to face film formation surface 152.

The shape of prism 141 is not limited. In the present embodiment, the shape of prism 141 is a column whose bottom surface is a trapezoid. In this case, the surface corresponding to one bottom side of the trapezoid is film formation surface 152, the surface corresponding to the other bottom side of the trapezoid is bottom surface 154, the surface corresponding to one leg is incidence surface 151, and the surface corresponding to the other leg is emission surface 153. In addition, the top surface and the bottom surface of the column are side surfaces 155 and 155.

Examples of the material of prism 141 include a resin and glass. Preferably, the material of prism 141 is a resin that has a refractive index of 1.4 to 1.6, and causes a small birefringence. Incidence surface 151 and emission surface 153 are important surfaces for ensuring the function of prism 141, and are therefore manufactured in such a manner as to obtain desired optical characteristics.

Metal film 142 is disposed on film formation surface 152 of prism 141. With this configuration, interaction (surface plasmon resonance) is caused between the photon of excitation light α that is incident on film formation surface 143 under the total reflection condition and the free electron in metal film 142, and thus localized-field light can be generated on the surface of metal film 142.

The material of metal film 142 is not limited as long as surface plasmon resonance can be caused. Examples of the material of metal film 142 include gold, silver, copper, aluminum, and their alloys. In the present embodiment, metal film 142 is a thin film formed of gold. The formation method for metal film 142 is not limited. Examples of the formation method for metal film 142 include sputtering, deposition, and plating. Preferably, the thickness of metal film 142 is, but not limited to, 30 to 70 nm.

Reaction site 143 is disposed on one surface (front surface), on which prism 141 is not disposed, of two surfaces (front surface and rear surface) of metal film 142. Reaction site 143 includes a primary antibody (capturing body) for capturing the detection object substance, and captures the detection object substance. The detection object substance captured by the primary antibody is fluorescence-labeled with the secondary antibody labeled with the fluorescence material. In this state, in reaction site 143, the fluorescence material is excited by localized light that is generated when metal film 142 is irradiated with excitation light α, and thus fluorescence γ is emitted.

Base 144 is disposed on a surface (front surface) of metal film 142 on which prism 141 is not disposed. Base 144 includes top surface 161, side surface 162 and bottom surface 163. In the present embodiment, base 144 is a plate-like transparent member that is disposed to cover reaction site 143, and has a size greater than film formation surface 152 of prism 141. In addition, in the present embodiment, base 144 has a rectangular shape in plan view. In base 144, channel groove 164 is formed on the surface (bottom surface 163) that faces metal film 142. Base 144 is joined to metal film 142 or prism 141 by bonding with an adhesive agent, laser welding, ultrasound welding, pressure bonding with a clamp member and the like, for example. In the present embodiment, when base 144 is joined to metal film 142, base 144 forms channel 166 including liquid storage section 165 together with metal film 142.

Base 144 includes, in addition to channel groove 164, first through hole 167 formed at one end of channel groove 164 and second through hole 168 formed at the other end of channel groove 164. Each of first through hole 167 and second through hole 168 has a columnar shape. When its opening is closed with metal film 142, channel groove 164 serves as channel 166. In addition, when the opening of channel 166 is closed with film formation surface 152 of prism 141, first through hole 167 and second through hole 168 serve as inlet 169 and outlet 170 of channel 166, respectively. A liquid feeding section (which is omitted in the drawing) can be connected to inlet 169.

The type of the sample is not limited. Examples of the sample include blood, serum, plasma, urine, nasal mucus, saliva, feces, coelomic fluid (such as cerebrospinal fluid, ascites, and pleural effusion), their diluted solution and the like. In addition, examples of the detection object substance contained in the sample include nucleic acid (single-stranded or double-stranded DNA, RNA, polynucleotide, oligonucleotide, PNA (peptide nucleic acid), nucleoside, nucleotides and their modifier molecules), protein (polypeptide or oligopeptide), amino acid (including modified amino acid), glucide (oligosaccharide, polysaccharide or sugar chain), lipid, their modifier molecules and complexes, and the like. Specifically, the detection object substance is a carcinoembryonic antigen such as AFP (alpha fetoprotein), a tumor marker, a signal transducer, a hormone or the like.

The material of base 144 is required to be readily shaped (transferred or released) and have high transparency, a low autofluorescence property with respect to ultraviolet ray and visible rays, and high thermal conductivity, for example. In view of this, preferably, the material of base 144 is a transparent resin. Examples of the resin used as the material of base 144 include polycarbonate, polymethylmethacrylate, polystyrene, polyacrylonitrile, polyvinyl chloride, polyethylene terephthalate, nylon 6, nylon 66, polyvinyl acetate, polyvinylidene chloride, polypropylene, polyisoprene, polyethylene, polydimethyl siloxane and cyclic polyolefin. Polycarbonate is preferable in view of ensuring high refractive index. Preferably, top surface 161 of base 144 has high flatness for allowing fluorescence γ generated at reaction site 143 to pass therethrough toward light detection section 133. In addition, preferably, bottom surface 163 has high flatness for making contact with chip holder 131. Side surface 162 and bottom surface 163 can be formed without taking their optical characteristics into account since no excitation light α is applied thereto.

(Manufacturing Method of Detection Chip)

Detection chip 110 is manufactured by the following method, for example. The manufacturing method of detection chip 110 includes a step of fabricating prism 141, a step of forming metal film 142 on film formation surface 152 of prism 141, a step of fabricating base 144, and a step of joining prism 141 on which metal film 142 is formed and base 144. Prism 141 and base 144 may be fabricated by injection molding with the above-described resin in view of manufacturing cost. As described above, incidence surface 151 and emission surface 153 of prism 141, and top surface 161 of base 144 are formed such that a desired optical characteristics are obtained. In addition, bottom surface 163 of base 144 serves as a reference for setting the position of detection chip 110 in the height direction with respect to chip holder 131, and is therefore formed to have high flatness. For example, the pressure exerted on bottom surface 163 of base 144 in the pressure holding step in the injection molding is set to a value higher than that on other surfaces of base 144. With this configuration, the flatness of bottom surface 163 of base 144 tends to be high. In addition, the pressure exerted on incidence surface 151 and emission surface 153 of prism 141 and top surface 161 of base 144 in the pressure holding step is set to low values. With this configuration, the anisotropy of the resin is small, and surfaces having desired optical characteristics can be easily obtained. Finally, detection chip 110 is obtained by joining film formation surface 152 of prism 141 and bottom surface 163 of base 144.

As illustrated in FIG. 2, excitation light α enters prism 141 from incidence surface 151. Excitation light α having entered prism 141 hits metal film 142 at a total reflection angle (an angle at which surface plasmon resonance is caused). By irradiating metal film 142 with excitation light α at an angle at which surface plasmon resonance is caused, localized light can be generated on metal film 142. With this localized light, the fluorescence material labelling the detection object substance placed on metal film 142 is excited, and fluorescence γ is emitted. By detecting the quantity of fluorescence γ emitted from the fluorescence material, SPFS system 100 (SPFS apparatus 120) detects the presence or the amount of the detection object substance.

Now the components of SPFS device 120 are described. As described above, SPFS apparatus 120 includes chip holder 131, excitation light irradiation section 132, light detection section 133 and control section 134. It is to be noted that, although not illustrated in the drawings, SPFS apparatus 120 may be covered with a transparent housing.

Figure 4A:
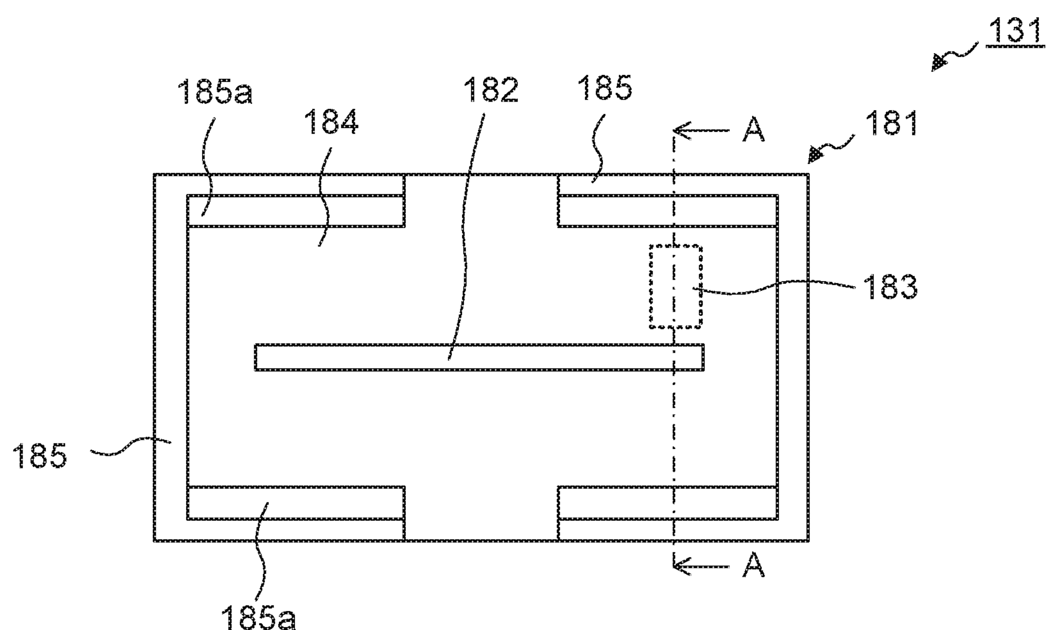
FIGS. 4A to 4C illustrate a configuration of a chip holder.
Figure 4B:
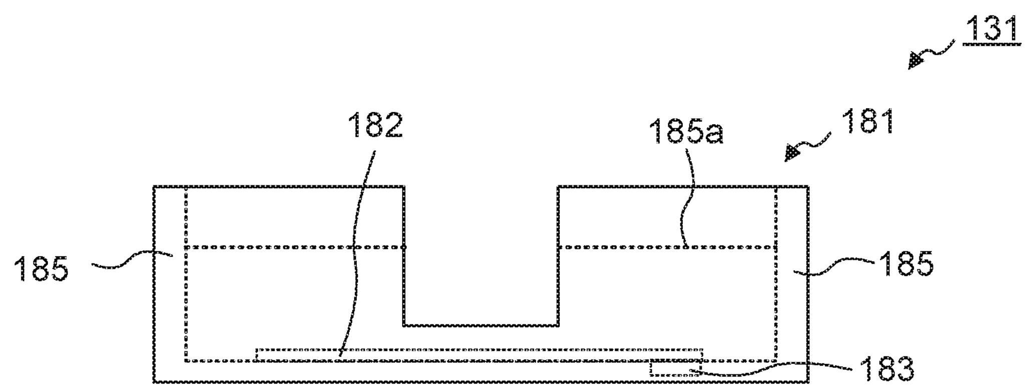
Figure 4C:
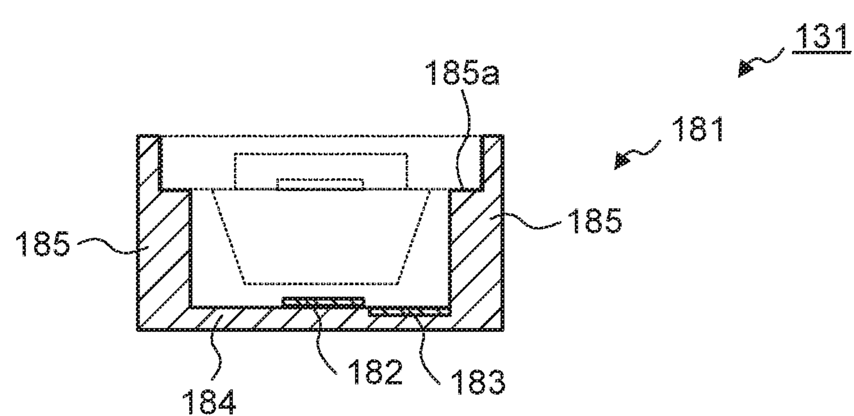

FIGS. 4A to 4C illustrate a configuration of chip holder 131. FIG. 4A is a plan view of chip holder 131, FIG. 4B is a side view of chip holder 131, and FIG. 4C is a sectional view taken along line A-A of FIG. 4A. It is to be noted that, in FIG. 4C, detection chip 110 is illustrated with the broken line.

As illustrated in FIGS. 4A to 4C, chip holder 131 includes chip holder main body 181, heat source 182 and temperature sensor 183. In plan view, the size of chip holder 131 is greater than the size of detection chip 110. Chip holder main body 181 sets the position of detection chip 110 at a predetermined position. Chip holder main body 181 includes bottom plate 184 and a pair of side plates 185. In the present embodiment, heat source 182 is disposed on bottom plate 184, and temperature sensor 183 is embedded in bottom plate 184. In addition, side plates 185 are disposed at both end portions of bottom plate 184 in the long-side direction.

As described above, preferably, chip holder 131 is precisely manufactured in view of accurately positioning detection chip 110 at a predetermined position. The material of chip holder 131 is not limited as long as detection chip 110 can be accurately positioned. In the present embodiment, the material of chip holder 131 is aluminum in view of ensuring working precision and thermal conductivity.

In the short-side direction of chip holder 131, the distance between opposite side plates 185 is, at least in part, approximately equal to the short-side length of base 144 of detection chip 110. In addition, in the long-side direction of chip holder 131, the distance between opposite pair of side plates 185 is, at least in part, approximately equal to the long-side length of base 144 of detection chip 110. It is to be noted that, in the short-side direction of chip holder 131, the distance between opposite side plates 185 may be, at least in part, slightly greater than the short-side length of base 144 of detection chip 110 as long as detection chip 110 can be disposed with a predetermined positioning accuracy. In addition, in the long-side direction of chip holder 131, the distance between opposite pair of side plates 185 may be, at least in part, slightly greater than the long-side length of base 144 of detection chip 110 as long as detection chip 110 can be disposed with a predetermined positioning accuracy. Further, on the inner side of side plate 185, step 185*a* that makes contact with bottom surface 163 of base 144 is disposed. The space between the pair of side plates 185 functions as a light path of excitation light α. That is, the pair of side plates 185 are disposed to avoid the light path of excitation light α emitted from excitation light irradiation section 132. With this configuration, chip holder 131 does not inhibit the function of SPFS apparatus 120.

Heat source 182 is connected with control section 134, and heats the liquid in channel 166 (in particular, the liquid on the upper side of reaction site 143) through prism 141. Heat source 182 is disposed at a position where heat source 182 faces, with a space therebetween, a surface of prism 141 closest to reaction site 143 among the surfaces of prism 141 which do not interfere with the light path of excitation light α. In the present embodiment, the "position where heat source 182 faces, with a space therebetween, a surface of prism 141 closest to reaction site 143 among the surfaces of prism 141 which do not interfere with the light path of excitation light α" is a position where heat source 182 faces bottom surface 154 of prism 141. That is, in the present embodiment, heat source 182 is disposed to face bottom surface 154 of prism 141 without making contact with bottom surface 154 of prism 141. In addition, preferably, the distance between bottom surface 154 of prism 141 and heat source 182 is equal to or smaller than 3.5 mm, more preferably equal to or smaller than 0.5 mm. When the distance between heat source 182 and prism 141 (bottom surface 154) is equal to or smaller than 3.5 mm, the heat generated by heat source 182 is conducted to prism 141 while behaving like heat conduction. When the distance between heat source 182 and prism 141 (bottom surface 154) is greater than 3.5 mm, the heat generated by heat source 182 is conducted to prism 141 in the form of heat radiation. That is, even in a non-contact state, when the distance between heat source 182 and prism 141 (bottom surface 154) is equal to or smaller than 3.5 mm, the heat generated by heat source 182 is conducted to prism 141 in a manner similar to heat conduction, and thus the liquid in channel 166 can be efficiently heated. Alternatively, heat source 182 may be disposed to face incidence surface 151 without making contact with incidence surface 151. Further, heat source 182 may be disposed to face emission surface 153 without making contact with emission surface 153. It is to be noted that, in each case, heat source 182 is disposed at a position where heat source 182 does not interfere with the light path of excitation light α.

Preferably, the length of heat source 182 in the long-side direction of detection chip 110 is greater than that of reaction site 143. In the present embodiment, in the long-side direction of detection chip 110, the length of heat source 182 is equal to that of channel 166.

The type of heat source 182 is not limited, and may be a cartridge heater, a rubber heater, an infrared ray heater such as a ceramic heater, a Peltier device or the like. The temperature of heat source 182 is not limited as long as the liquid of the reaction site in liquid storage section 165 can be maintained at a temperature of 34 to 40° C. In the present embodiment, the temperature of heat source 182 is 40 to 50° C.

Temperature sensor 183 is embedded in chip holder main body 181. Temperature sensor 183 estimates the temperature of the liquid in channel 166 by measuring the temperature of a region near chip holder main body 181 where heat source 182 is disposed. The type of temperature sensor 183 is not limited as long as the above-described function can be ensured. In the present embodiment, temperature sensor 183 is a thermistor thermometer.

In addition, preferably, the distance between reaction site 143 and the contacting part between chip holder 131 and detection chip 110 held in chip holder 131 is greater than the distance between heat source 182 and reaction site 143. With this configuration, it is possible to prevent a situation in which the liquid in channel 166 cannot be controlled at a desired temperature with the heat of heat source 182 conducted through chip holder main body 181 and base 144.

When installing a detection chip to chip holder 131, bottom surface 163 of base 144 is brought into contact with the top surface of side plate 185 of chip holder main body 181 to set the position of detection chip 110 in the height direction. In addition, the position of detection chip 110 in the plane direction is set by keeping (holding) the side surface (reference surface) of base 144 on the inner surface of side plate 185 of chip holder main body 181. At this time, heat source 182 is disposed such that heat source 182 faces bottom surface 154 of prism 141 without making contact with bottom surface 154. When the heating with heat source 182 is performed in this state, the interior of channel 166 (the liquid retained in channel 166) is quickly heated through prism 141.

Excitation light irradiation section 132 emits excitation light α toward metal film 142 of detection chip 110. Excitation light α is totally reflected by metal film 142, and then becomes reflection light β. Excitation light irradiation section 132 includes a light source. The light source is turnable about a predetermined point in detection chip 110, and can change the incident angle of excitation light α with respect to metal film 142. The type of the light source is not limited. Examples of the light source include a gas laser, a solid-state laser, a semiconductor laser and a light-emitting diode (LED). For example, excitation light α is gas laser light or solid-state laser light having a wavelength of 200 to 1000 nm, or semiconductor laser light having a wavelength of 385 to 800 nm.

Light detection section 133 detects fluorescence γ emitted from metal film 142. Light detection section 133 is disposed to face a surface, which faces away from the prism 141, of metal film 142 of detection chip 110 held in the chip holder. Light detection section 133 includes first lens 191, filter 192, second lens 193 and light sensor 194.

First lens 191 and second lens 193 form a conjugate optical system that is not easily influenced by stray light. The light that travels between first lens 191 and second lens 193 are substantially parallel light. First lens 191 and second lens 193 bring fluorescence γ emitted from metal film 142 into an image on the light reception surface of light sensor 194.

Filter 192 is disposed between first lens 191 and second lens 193. Filter 192 contributes to improvement in accuracy and sensitivity of fluorescence detection performed by light sensor 194. Filter 192 is an optical filter, a cut filter or the like, for example. Examples of the optical filter include a neutral density (ND) filter, a diaphragm lens and the like. A cut filter removes noise components such as external light (illuminating light outside the apparatus), transmitted components of excitation light α, stray light (scattering components of excitation light α), plasmon scattering light (scattering light that is generated from excitation light α affected by materials adhering on the surface of detection chip 110 and the like), and autofluorescence of the components. Examples of the cut filter include an interference filter, a color filter and the like.

Light sensor 194 detects fluorescence γ emitted from detection chip 110 and coming through filter 192. Light sensor 194 is an ultra-sensitive photomultiplier tube, a CCD image sensor capable of multi-point measurement, or the like, for example.

Control section 134 controls chip holder 131, excitation light irradiation section 132 and light detection section 133 in a centralized manner. Control section 134 includes a publicly known computer, microcomputer, or the like including a computation device, a control device, a storage device, and an inputting device, for example. In addition, control section 134 may feedback-control heat source 182 based on the detection result of temperature sensor 183.

(Effect)

As described above, SPFS system 100 according to the present embodiment sets the position in the height direction by bringing precisely shaped bottom surface 163 of base 144 and side plate 185 of chip holder 131 into contact with each other, and sets the position in the plane direction by keeping (holding) side surface 162 of base 144 on the inner surface of chip holder 131, whereby SPFS system 100 according to the present embodiment can accurately position detection chip 110 with respect to chip holder 131. In addition, the liquid in channel 166 can be quickly heated because heat source 182 is disposed to face without making contact with bottom surface 154 of prism 141.

Embodiment 2

An SPFS system according to Embodiment 2 is different from SPFS system 100 according to Embodiment 1 in configurations of detection chip 210 and chip holder 210. The same configurations are therefore denoted with the same reference numerals, and the description thereof is omitted so that different parts are mainly described.

Figure 5A:
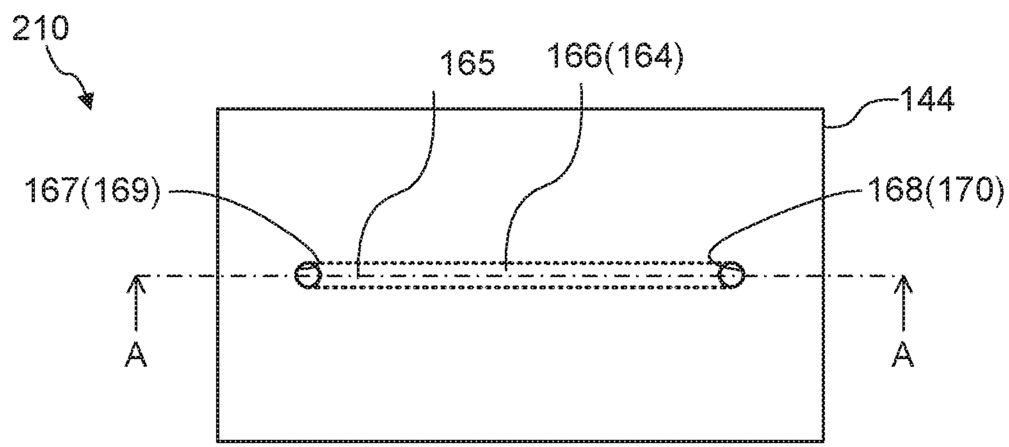
FIGS. 5A to 5C illustrate a configuration of a detection chip in an SPFS system of Embodiment 2.
Figure 5B:
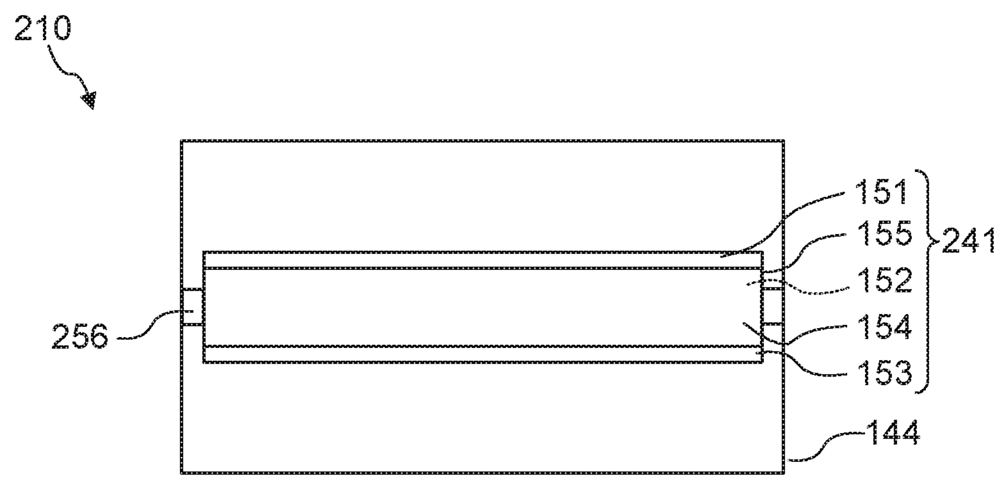
Figure 5C:
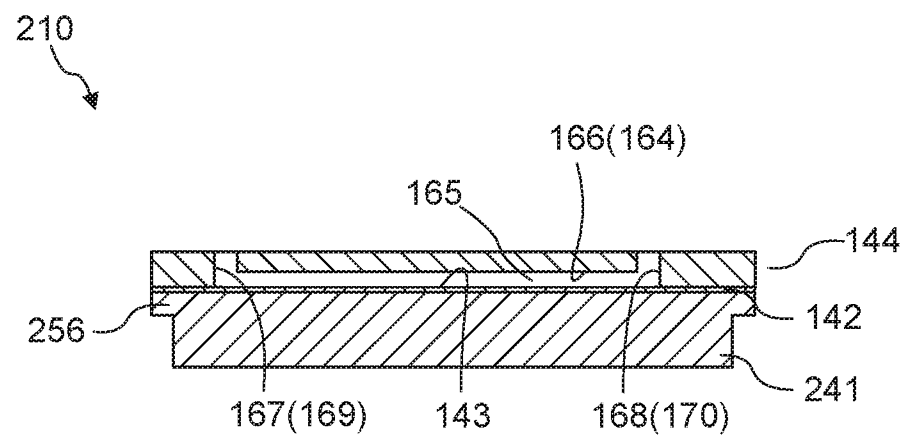

FIGS. 5A to 5C illustrate a configuration of detection chip 210 of the SPFS system of Embodiment 2. FIG. 5A is a plan view of detection chip 210, FIG. 5B is a bottom view of detection chip 210, and FIG. 5C is a sectional view taken along line A-A of FIG. 5A.

In detection chip 210 of the SPFS system according to Embodiment 2, prism 241 includes metal film 142, reaction site 143, base 144 and protrusion 256. In addition, protrusions 256 are disposed on prism 241 (side surfaces 155).

Protrusion 256 serves as a reference for positioning detection chip 210 to chip holder 131. As long as this function can be ensured, the shape of protrusion 256 is not limited. In the present embodiment, protrusion 256 has a cubic shape whose one surface is connected with side surface 155 of prism 241. In addition, the position of protrusion 256 on side surface 155 is not limited. In the present embodiment, protrusion 256 is disposed such that one surface of protrusion 256 flushes with film formation surface 152.

Preferably, protrusion 256 is fabricated integrally with prism 241 by injection molding. In the present embodiment, in the pressure holding step in injection molding, the pressure exerted on incidence surface 151, emission surface 153, side surface 155 and protrusion 256 is higher than the pressure exerted on bottom surface 154. In this manner, the flatness of the surfaces of prism 241 except in bottom surface 154, and each surface of protrusion 256 tends to be higher than that of bottom surface 154.

Figure 6A:
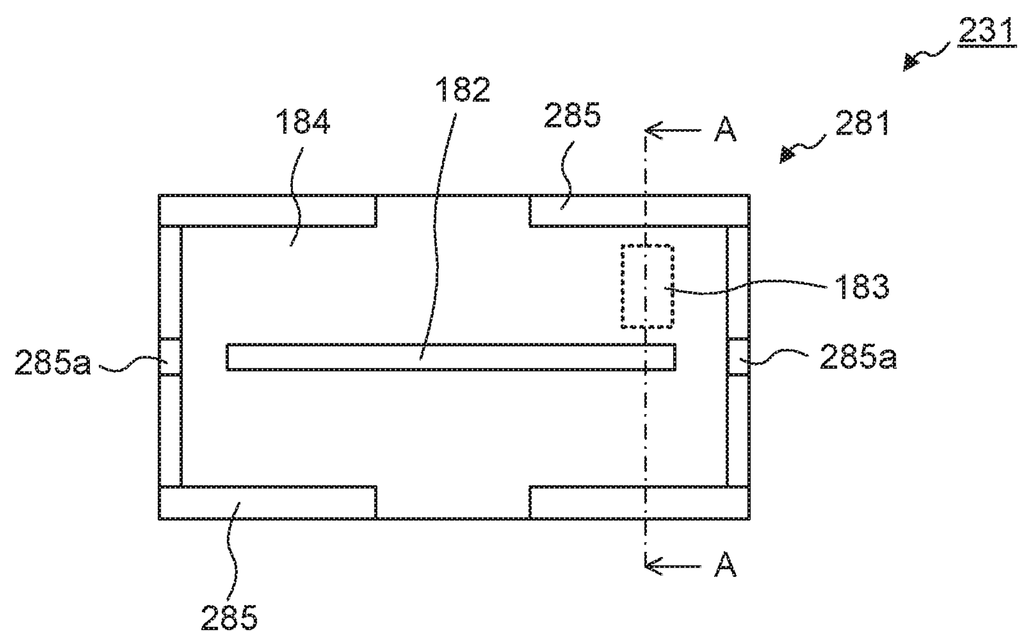
FIGS. 6A to 6C illustrate a configuration of a chip holder in the SPFS system of Embodiment 2.
Figure 6B:
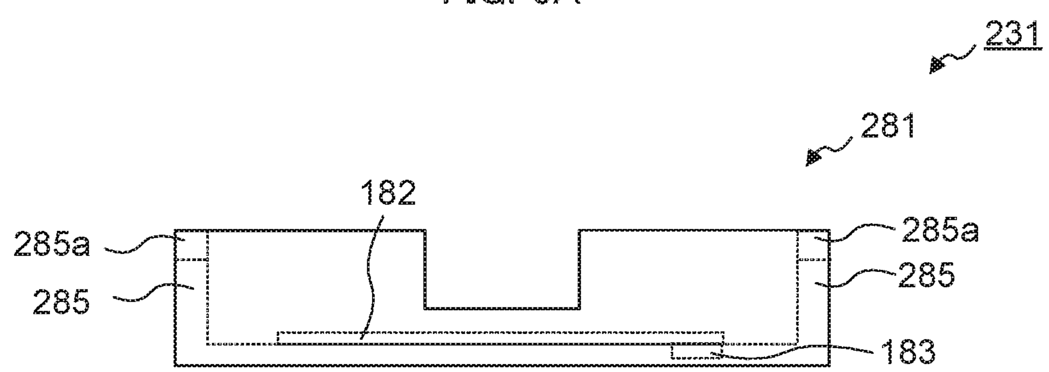
Figure 6C:
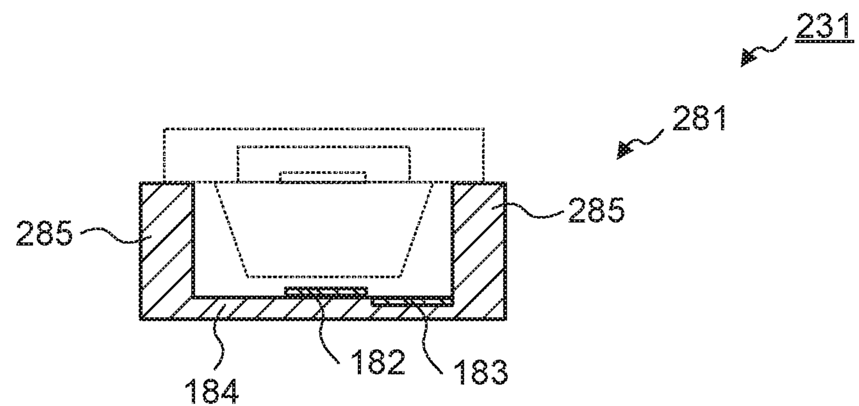

FIGS. 6A to 6C illustrate a configuration of chip holder 231. FIG. 6A is a plan view of chip holder 231, FIG. 6B is a side view of chip holder 231, and FIG. 6C is a sectional view taken along line A-A of FIG. 6A. In FIG. 6C, detection chip 210 is indicated by the broken line.

As illustrated in FIGS. 6A to 6C, chip holder 231 of the SPFS system according to Embodiment 2 includes chip holder main body 281, heat source 182 and temperature sensor 183. Chip holder 231 includes bottom plate 184 and a pair of side plates 285. The distance between the inner surfaces of the pair of side plates 285 in the long-side direction is, at least in part, approximately equal to the distance between the pair of side surfaces 155 of prism 241. It is to be noted that the distance between the inner surfaces of the pair of side plates 285 in the long-side direction may be, at least in part, may be slightly larger than the distance between the pair of side surfaces 155 of prism 241 as long as detection chip 110 can be installed with a predetermined positioning accuracy. In addition, the inner surface of side plate 285 is provided with recess 285*a* that matches the shape of protrusion 256.

When installing detection chip 210 in chip holder 231, bottom surface 163 of base 144 is brought into contact with the top surface of side plate 285 of chip holder main body 281 to set the position of detection chip 210 in the height direction. In addition, the position of detection chip 210 in the plane direction is set by bringing recess 285*a* into contact with protrusion 256 while keeping (holding) side surface 155 of prism 241 between the inner surfaces of the pair of side plates 285. At this time, heat source 182 is disposed such that heat source 182 faces bottom surface 154 of prism 241 without making contact with bottom surface 154.

(Effect)

With the above-mentioned configuration, the SPFS system according to the present embodiment provides an effect similar to that of Embodiment 1.

(Modification)

Figure 7A:
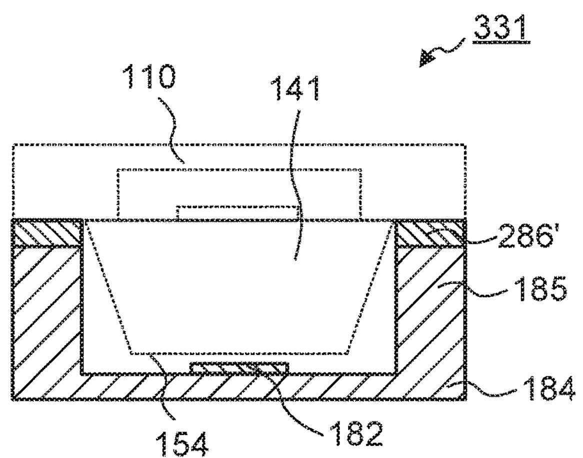
FIGS. 7A to 7D are sectional views of chip holders according to modifications.
Figure 7B:
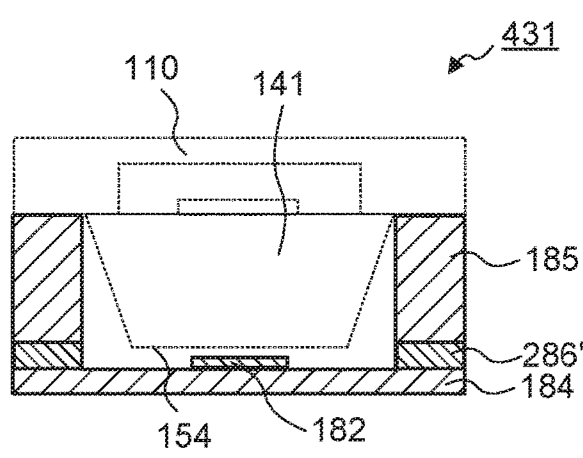
Figure 7C:
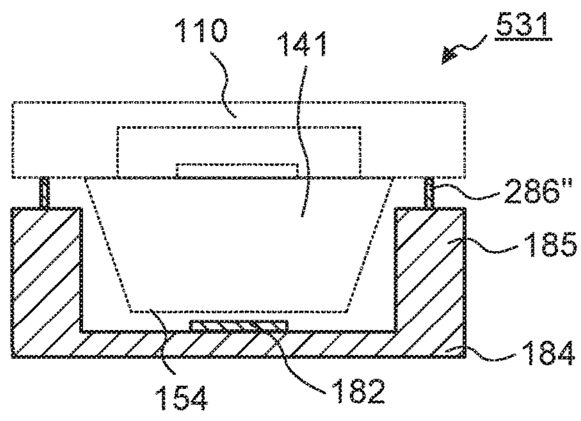
Figure 7D:
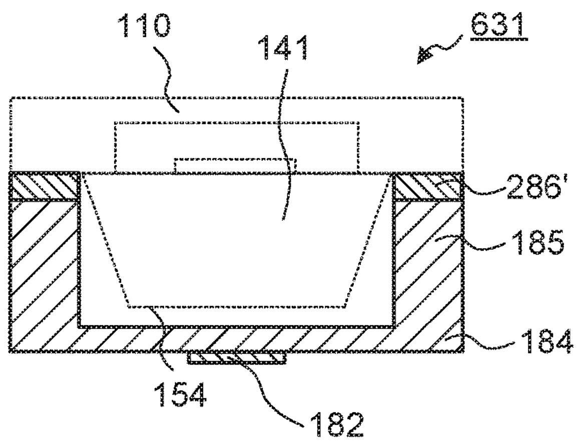

It is to be noted that the chip holder may include heat insulating member 286 that blocks or reduces heat conduction from the heat source. FIGS. 7A to 7D are sectional views of chip holders 331, 431, 531 and 631 according to modifications of Embodiment 1 and Embodiment 2. FIG. 7A is a sectional view of chip holder 331 according to Modification 1, FIG. 7B is a sectional view of chip holder 431 according to Modification 2, FIG. 7C is a sectional view of chip holder 531 according to Modification 3, and FIG. 7D is a sectional view of chip holder 631 according to Modification 4.

The type of heat insulating member 286 is not limited as long as the above-described function can be ensured. Examples of heat insulating member 286 include heat insulation material 286', and protruding structure 286" having a small contact area with detection chips 110 and 210. Examples of the heat insulation material include titanium, lead, ceramic, alumina, polyethylene, hard urethane, and a Kapton heat insulating sheet. As illustrated in FIG. 7A, heat insulation material 286' may be disposed between the top surface of side plate 185 of chip holder 331 and detection chip 110. In addition, as illustrated in FIG. 7B, heat insulation material 286' may be disposed between bottom plate 184 of chip holder 431 and side plate 185. Further, as illustrated in FIG. 7C, the heat insulation material may be protruding structure 286" such that the cross-sectional area in the plane direction of the top surface of side plate 185 of chip holder 531 decreases toward detection chip 110.

In addition, as illustrated in FIG. 7D, heat source 182 may be disposed on the bottom surface of bottom plate 184 of chip holder 631. In this case, preferably, the distance between bottom plate 184 of chip holder 631 and bottom surface 154 of prism 141 is equal to or smaller than 3.5 mm, more preferably, equal to or smaller than 0.5 mm.

In addition, although not illustrated in the drawings, heat insulation material 286' may be disposed between heat source 182 and chip holder 631.

In addition, the positions of detection chips 110 and 210 with respect to chip holders 131 and 231 may be set by setting the position in the height direction at bottom surface 163 of base 144, by setting the position in a first direction in the plane direction at side surface 155 of prism 141 in the short-side direction, and by setting the position in a second direction orthogonal to the first direction in the plane direction at the side surface (reference surface) of protrusion 256 perpendicular to side surface 155. In addition, the positions may be set by setting the position in the height direction at bottom surface 163 of base 144, by setting the position in the first direction in the plane direction at side surface 155 of prism 141 in the long-side direction, and by setting the position in the second direction orthogonal to the first direction in the plane direction at the side surface (reference surface) of protrusion 256 perpendicular to side surface 155. In addition, incidence surface 151 and emission surface 153 may be used as reference surfaces for positioning. For example, the positions of detection chips 110 and 210 in the height direction may be set by bringing chip holders 131 and 231 into contact with both incidence surface 151 and emission surface 153.

Further, SPFS system may include a second heat source that heats the liquid in channel 166 from the upper side of detection chip 110. In this case, the second heat source is disposed at a position near reaction site 143 and remote from the contacting part of bottom surface 163 of base 144 and chip holder 131. The SPFS system including the second heat source can further quickly heat the liquid in channel 166, and can improve the effect of conserving the heat of the liquid stored in channel 166 in comparison with the SPFS systems (SPFS apparatuses) according to Embodiment 1 and Embodiment 2.

In addition, detection chip 110 may include a reagent storage section for storing liquid (such as sample and reagent). Then, the SPFS system may include a third heat source that heats the reagent storage section. With this configuration, the difference between the temperature of the liquid in channel 166 and the temperature of the liquid from the reagent storage section can be reduced, and accordingly a detection object substance can be detected with high accuracy.

(Operation of SPFS System)

Figure 8:
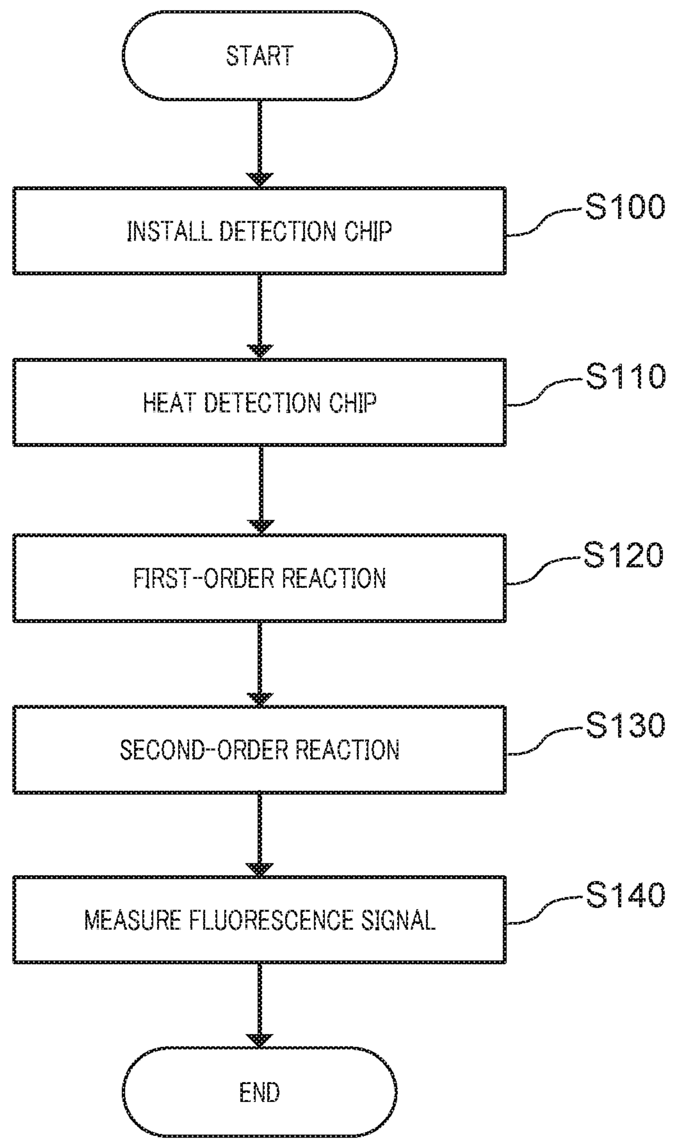
FIG. 8 is a flowchart of an operation procedure of the SPFS system according to Embodiment 1.

Now a detection operation (the detection method according to Embodiment 1 of the present invention) of SPFS system 100 (SPFS apparatus 120) is described. FIG. 8 is a flowchart of an exemplary operation procedure of SPFS system 100 (SPFS apparatus 120).

First, detection chip 110 is installed in chip holder 131 of SPFS system 100 (SPFS apparatus 120) (S100). At this time, bottom surface 163 makes contact with the side plate of chip holder 131, and side surface 162 of base 144 makes contact with the inner surface of chip holder 131, whereby detection chip 110 is accurately positioned with respect to chip holder 131. In addition, heat source 182 is disposed to face bottom surface 154 of prism 141 without making contact with bottom surface 154.

Next, control section 134 operates heat source 182 to heat the interior of channel 166 (S110). In this manner, the interior of channel 166 is heated to a temperature approximately equal to the temperature of the liquid of the reaction site. In the present embodiment, the temperature of the liquid of the reaction site is 37° C., which is an optimum temperature for the first-order reaction and the second-order reaction. At this time, control section 134 may feedback-control heat source 182 based on the detection result of temperature sensor 183.

Next, a sample that potentially contains a detection object substance is fed to channel 166 (S120). The sample is moved back and forth in channel 166 by operating a pump such that the detection object substance is surely captured by the capturing body (primary antibody) fixed in reaction site 143 (to cause an antigen-antibody reaction). At this time, since the interior of liquid storage section 165 is set at a temperature equal to the analysis temperature, the sample fed to channel 166 (liquid storage section 165) is heated to the analysis temperature immediately after the sample is fed. Then, the detection object substance contained in the sample is surely captured by the capturing body (primary antibody). Thereafter, the sample in channel 166 is removed, and the interior of channel 166 is washed with washing solution.

Next, a reagent containing a secondary antibody labeled with a fluorescence material is fed to channel 166 by the pump (S130). Also, the reagent fed to channel 166 is heated to the analysis temperature immediately after the reagent is fed. Then, the secondary antibody labeled with the fluorescence material contained in the reagent is surely coupled with the detection object substance. It is to be noted that liquid may be fed to the channel in the state where a sample and a reagent are preliminarily mixed and the detection object substance and the secondary antibody are preliminarily coupled. In this manner, the detection object substance is labeled with the fluorescence material. Thereafter, the reagent (labeling solution) in channel 166 is removed, and the interior of channel 166 is washed with washing solution.

Next, excitation light α is emitted by the light source to detection chip 110 in such a manner that excitation light α hits metal film 142 at a specific incident angle (see FIG. 2). Then, a fluorescence γ signal, which is emitted when the resulting localized light efficiently excites the fluorescence material labelling the detection object substance captured on reaction site 143, is detected (S140).

Through the above-mentioned procedure, the presence or the amount of the detection object substance in the sample can be detected.

Now a detection operation (the detection method according to Embodiment 2 of the present invention) of the SPFS system (SPFS apparatus) is described. The detection operation (the detection method according to Embodiment 2 of the present invention) of the SPFS system (SPFS apparatus) is different from the detection operation of SPFS system 100 (SPFS apparatus 120) according to Embodiment 1 only in that detection chip 210 is installed in the chip holder of the SPFS apparatus.

In the SPFS system according to Embodiment 2 (SPFS apparatus), bottom surface 163 is brought into contact with the side plate of chip holder 231, whereby the position of detection chip 210 in the height direction is set with respect to chip holder 231. In addition, the side surface of prism 141 is brought into contact with the inner surface of chip holder main body 281, and protrusion 256 is brought into contact with recess 285*a*, whereby the position of detection chip 210 in the plane direction is set with respect to chip holder 231. In addition, heat source 182 is disposed to face bottom surface 154 of prism 141.

In addition, while the SPFS system (SPFS apparatus) is described in Embodiment 1 and Embodiment 2, the detection apparatus is not limited to the SPFS system (SPFS apparatus) in the present invention. For example, in the present invention, the detection apparatus may be an SPR system (SPR apparatus). In this case, the SPR system (SPR apparatus) includes a light detection section that detects excitation light reflected by a metal thin film and emitted from an emission surface.

This application is entitled to and claims the benefit of Japanese Patent Application No. 2015-223415 filed on Nov. 13, 2015, the disclosure each of which including the specification, drawings and abstract is embedded herein by reference in its entirety.

INDUSTRIAL APPLICABILITY

The detection apparatus, the detection method and the detection system according to the embodiments of the present invention that utilize surface plasmon resonance can measure a detection object substance with high reliability, and therefore are suitable for laboratory tests and the like, for example.

REFERENCE SIGNS LIST

10 Detection chip
11 Prism
12 Incidence surface
13 Bottom surface
14 Emission surface
15 Base
16 Rear surface
20 Positioning block
100 SPFS system
110, 210 Detection chip
131, 231, 331, 431, 531, 631 Chip holder
132 Excitation light irradiation section
133 Light detection section
134 Control section
141 Prism
142 Metal film
143 Reaction site
144 Base
151 Incidence surface
152 Film formation surface
153 Emission surface

154 Bottom surface
155 Side surface
161 Top surface
162 Side surface
163 Bottom surface
164 Channel groove
165 Liquid storage section
166 Channel
167 First through hole
168 Second through hole
169 Inlet
170 Outlet
181 Chip holder main body
182 Heat source
183 Temperature sensor
184 Bottom plate
185, 285 Side plate
185*a* Step
191 First lens
192 Filter
193 Second lens
194 Light sensor
256 Protrusion
285*a* Recess
286' Heat insulation material
286" Protruding structure

The invention claimed is:

1. A detection apparatus for detecting presence or an amount of a detection object substance contained in a sample by utilizing surface plasmon resonance, the detection apparatus comprising:

a detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage that stores liquid;

a chip holder for positioning the detection chip;

an excitation light irradiator that emits excitation light toward a rear surface of the metal film through the incidence surface of the detection chip held in the chip holder, the rear surface corresponding to the reaction site;

a heat source disposed to face one surface of the prism of the detection chip held in the chip holder without making contact with the one surface of the prism, the one surface of the prism being closest to the reaction site among the surfaces of the prism which do not interfere with a light path of the excitation light; and a light detector that detects fluorescence generated by a fluorescence material labelling the detection object substance contained in the sample captured by the capturing body in the reaction site and excited by the excitation light, or detects reflection light of excitation light reflected by the metal film and emitted from the emission surface utilizing surface plasmon resonance, wherein the chip holder positions the detection chip by making contact with at least one of a bottom surface of the base and a reference surface disposed on the prism, or by holding at least one of the bottom surface and the reference surface, and the heat source does not contact the bottom surface of the base.

2. The detection apparatus according to claim 1, wherein, when the detection chip is held in the chip holder, a distance between the heat source and the one surface closest to the reaction site is equal to or smaller than 3.5 mm.

3. The detection apparatus according to claim 1, wherein, when the detection chip is held in the chip holder, a distance between the heat source and the one surface closest to the reaction site is equal to or smaller than 0.5 mm.

4. The detection apparatus according to claim 1, wherein, when the detection chip is held in the chip holder, a distance between the reaction site and a contacting part of the chip holder and the detection chip is greater than a distance between the heat source and the reaction site.

5. The detection apparatus according to claim 1, wherein the chip holder includes a heat insulating member that blocks or reduces heat conduction from the heat source to the detection chip when the detection chip is held in the chip holder.

6. The detection apparatus according to claim 1, wherein the chip holder has a bottom wall, and the heat source is on the bottom wall.

7. A method of detecting presence or an amount of a detection object substance contained in a sample by utilizing surface plasmon resonance, the method comprising:

preparing a detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage that stores liquid, the detection chip including a reference surface formed at a bottom surface of the base or the prism;

positioning the detection chip in a chip holder by bringing at least one of the bottom surface and the reference surface into contact with the chip holder, or by holding at least one of the bottom surface and the reference surface on the chip holder;

heating liquid in the liquid storage with a heat source, the heat source being disposed to face one surface of the prism of the detection chip positioned in the chip holder without making contact with of the one surface of the prism, the one surface of the prism being closest to the reaction site among the surfaces of the prism which do not interfere with a light path of excitation light emitted toward a rear surface of the metal film through the incidence surface, the rear surface corresponding to the reaction site;

emitting excitation light toward the rear surface of the metal film that corresponds to the reaction site through the incidence surface; and detecting fluorescence generated by a fluorescence material labelling the detection object substance contained in the sample captured by the capturing body in the reaction site and excited with the excitation light, or reflection light of excitation light reflected by the metal film and emitted from the emission surface utilizing surface plasmon resonance, wherein the heat source does not contact the bottom surface of the base.

8. A detection system for detecting presence or an amount of a detection object substance contained in a sample by utilizing surface plasmon resonance, the detection system comprising:

a detection chip including a prism including an incidence surface, an emission surface and a film formation surface, a metal film formed on the film formation surface, a capturing body disposed in a reaction site that is at least a part of a region on the metal film, and a base that forms, together with the metal film or the film formation surface, a liquid storage that stores liquid, the detection chip including a reference surface formed at a bottom surface of the base and the prism;

a chip holder for positioning the detection chip by making contact with at least one of the bottom surface and the reference surface, or by holding the bottom surface and the reference surface;

an excitation light irradiator that emits excitation light toward the reaction site through the incidence surface;

a heat source disposed to face one surface of the prism of the detection chip held in the chip holder without making contact with the one surface of the prism, the one surface of the prism being closest to the reaction site among the surfaces of the prism which do not interfere with a light path of the excitation light; and a light detector that detects fluorescence generated by a fluorescence material labelling the detection object substance contained in the sample captured by the capturing body in the reaction site and excited by the excitation light, or detects reflection light of excitation light reflected by the metal film and emitted from the emission surface utilizing surface plasmon resonance, wherein the heat source does not contact the bottom surface of the base.

* * * * *